(12) United States Patent
Kulpinski

(10) Patent No.: US 7,622,730 B2
(45) Date of Patent: Nov. 24, 2009

(54) SINGLE SIDED DUAL SCANNING FOR COMPUTED RADIOGRAPHY

(75) Inventor: Robert W. Kulpinski, Penfield, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 12/204,901

(22) Filed: Sep. 5, 2008

(65) Prior Publication Data

US 2009/0039298 A1  Feb. 12, 2009

Related U.S. Application Data

(63) Continuation-in-part of application No. 11/611,976, filed on Dec. 18, 2006, now abandoned.

(51) Int. Cl.
    *G01T 1/105* (2006.01)
(52) U.S. Cl. .................................................. 250/585
(58) Field of Classification Search ................ 250/585, 250/580, 581, 584
    See application file for complete search history.

(56) References Cited

U.S. PATENT DOCUMENTS

| | | | |
|---|---|---|---|
| 3,859,527 | A | 1/1975 | Luckey |
| 4,380,702 | A | 4/1983 | Takahashi et al. |
| 4,527,060 | A | 7/1985 | Suzuki et al. |
| 4,571,496 | A | 2/1986 | Arakawa et al. |
| 4,695,725 | A | 9/1987 | Mori et al. |
| 4,837,436 | A | 6/1989 | Whiting |
| 4,950,559 | A | 8/1990 | Arakawa et al. |
| 5,024,791 | A | 6/1991 | Cusano et al. |
| 5,591,982 | A | 1/1997 | Kohda |
| 5,661,306 | A | 8/1997 | Arakawa |
| 5,665,962 | A | 9/1997 | Kimura |
| 5,877,508 | A | 3/1999 | Arakawa et al. |
| 6,016,356 | A | 1/2000 | Ito et al. |
| 6,369,402 | B1 | 4/2002 | Gebele et al. |
| 6,479,834 | B1 | 11/2002 | Suzuki |
| 6,614,044 | B2 * | 9/2003 | Yamada ..................... 250/584 |
| 7,230,261 | B2 * | 6/2007 | Iwabuchi et al. ............ 250/581 |
| 2003/0020031 | A1 | 1/2003 | Otokuni |
| 2005/0167622 | A1 | 8/2005 | Mitchell et al. |
| 2006/0091338 | A1 | 5/2006 | Koren |
| 2006/0180773 | A1 | 8/2006 | Frankenberger et al. |

* cited by examiner

*Primary Examiner*—David P Porta
*Assistant Examiner*—Kiho Kim

(57) ABSTRACT

A radiation image formation read out method for a storage phosphor screen. A phosphor screen is exposed to a first stimulating radiation from a first side of the screen to release a first stimulated radiation in the pattern of the stored image. The first stimulating radiation is at a first power level, a first scan speed, and a first set of scanning parameters and is photoelectrically detected. The storage phosphor screen is again exposed to a second stimulating radiation from the first side of the screen to release a second stimulated radiation in the pattern of the stored image. The first stimulated radiation has a greater amount of high spatial frequency image data than the second stimulated radiation. The second stimulating radiation is at a second power level, a second scan speed, and a second set of scanning parameters. The second scanning exposure is higher than the first scanning exposure and the second set of scanning parameters differs in at least one parameter from the first set of scanning parameters.

16 Claims, 13 Drawing Sheets

SINGLE SIDED DUAL SCANNING FOR COMPUTED RADIOGRAPHY

CROSS REFERENCE TO RELATED APPLICATIONS

This is a Continuation-in-Part of commonly assigned application U.S. Ser. No. 11/611,976, entitled "SINGLE SIDED DUAL SCANNING FOR COMPUTED RADIOGRAPHY", filed on Dec. 18, 2006 now abandoned in the name of Kulpinski, both incorporated herein by reference.

FIELD OF THE INVENTION

The invention relates generally to the field of imaging, and in particular to methods of reading/scanning radiation images. More specifically, the invention relates to scanning radiation images recorded in a stimulable phosphor layer on a storage phosphor screen.

BACKGROUND OF THE INVENTION

Computed Radiography (CR) is a well known technology for recording radiation images which is based on stimulable storage phosphors. As described in U.S. Pat. No. 3,859,527 (Luckey), when certain types of phosphors are exposed to high energy radiation, such as x-rays, gamma rays, etc., they store a portion of the energy of the incident radiation. If the phosphor that has been exposed to high-energy radiation is then exposed to a second, stimulating radiation, such as visible light or heat, the phosphor will emit radiation in proportion to the stored energy of the high energy radiation. Screens formed from such storage phosphors have been discussed in the literature as having very desirable properties, in terms of sensitivity and exposure latitude, for the detection of x-ray images in projection radiography.

The storage phosphor's stimulated signal is recognized as being linearly related to radiation exposure over at least 5 orders of magnitude. It is recognized that it can be challenging to design analog electronics that can handle signals over such a wide range without degradation. Likewise, analog-to-digital converters do not typically cover such a large signal variation. Analog compression schemes, such as logarithmic amplifiers, tend to have speed and gain limitations. Thus, while storage phosphor systems are inherently well suited for projection radiography, it is challenging to design economical electronic systems which do not degrade the available signal.

There are a number of parameters that, taken together, characterize the performance of x-ray imaging systems. For CR, these parameters include spatial resolution, noise, detective quantum efficiency (DQE), exposure response, and artifacts.

For CR, the modulation transfer function (MTF) of the imaging system is often used to characterize the system spatial resolution. MTF is a 2D (two-dimensional) function of spatial frequency and is usually measured for both x and y directions of the acquired image.

The noise of the imaging system determines the system low-contrast resolution as well as the x-ray detective efficiency. The noise characteristics can be described by the noise power spectrum (NPS) of the imaging system, which is also a 2D function of spatial frequency. To obtain the NPS, a flat image region is usually taken for Fourier analysis. Because the system noise level is also x-ray exposure-dependent, the NPS is often measured at a certain exposure level to facilitate comparisons among imaging systems.

Detective quantum efficiency (DQE) is a secondary parameter of the imaging system that can be calculated from the system MTF, NPS, and the air kerma of the x-ray exposure at the detector.

It is desirable to have an x-ray imaging system with improved MTF and DQE to provide improved diagnostic efficacy and/or lower patient dose. However, factors that tend to improve high frequency MTF tend, at the same time, to degrade low frequency DQE. Similarly, steps taken to improve low frequency DQE tend to compromise high frequency MTF. For example, for a given storage phosphor screen thickness, increasing the readout laser exposure decreases high frequency MTF while increasing low frequency DQE. Conversely, lower laser exposure increases high frequency MTF while decreasing low frequency DQE. Given these constraints, optimizing CR by simultaneously improving MTF and DQE is challenging.

There has been some effort expended for reading out wide dynamic range images with storage phosphor systems. One technique is the use of a preliminary scan at low stimulating intensity to determine the exposure level of the latent image on the storage phosphor screen. For example, U.S. Pat. No. 4,527,060, issued Jul. 2, 1985 (Suzuki et al.) reads a small percentage of the latent image using a low power stimulating beam, and uses this information to optimally set the gain or scaling factor of the electronics for a full intensity final scan, to ensure that no information is lost due to too high an exposure or inadequate gain. However, this operation causes some degradation in the DQE of the final scan.

U.S. Pat. No. 4,837,436, issued Jun. 6, 1989 (Whiting), commonly assigned, performs two scans of the image. A first scan of the latent image is conducted at a low stimulating exposure to capture the high x-ray exposure image signal and a second scan is conducted at a high stimulating exposure to capture the low x-ray exposure image signal. Information from both signals is then combined into one wide dynamic range image signal covering a wider dynamic range than could be obtained by a single scan. This approach enhances the dynamic range, but does not improve the system MTF.

Another technique for optimizing the output image data is to conduct two scans of the image. U.S. Patent Application Publication No. 2003/0020031 entitled "Radiation Image Read-out Method and Apparatus" by Otokuni describes an image plate reading mechanism that, using a movable read-out device, obtains a first reading of the stored image when scanning in one direction and a second reading that obtains residual image data when scanning in the opposite direction. However, this approach does not improve the system MTF.

U.S. Patent Application Publication No. 2006/0091338 entitled "Image Acquisition System for Improved DQE" by Koren describes a scanning method using first and second laser beams from a beam direction apparatus rotatable on an axis.

Another approach to improve image quality is the use of a dual-side read technique for CR image plates. With this method, described, for example, in U.S. Pat. No. 5,877,508 entitled "Radiation Image Storage Panel" to Arakawa et al., the stored image is obtained from read-out sensors that are positioned on opposite sides of the imaging plate.

Imaging panels having multiple phosphor layers have been proposed, for example, see U.S. Pat. No. 6,479,834 entitled "Double-Sided Reading System for Reproducing Radiation Image" to Suzuki. Approaches for imaging panel optimization have included the use of multiple phosphor layers, wherein the phosphors have different particle sizes on each layer, as described in the Suzuki '834 patent.

Layers on the same imaging plate and having different thickness have also been proposed for obtaining different energy levels of x-ray radiation, as described in U.S. Patent Application Publication No. 2006/0180773 entitled "Radiography System and Method for Recording X-Rays in Phosphor Layers" by Frankenberger et al.

The dual-sided scan approach can improve low-frequency DQE, but does not improve the system MTF.

Other approaches have included use of colorant layers for optimizing the obtained output signal by selective absorption of various wavelengths, as described, for example, in U.S. Pat. No. 4,380,702 entitled "Radiation Image Storage Panel" to Takahashi et al. The use of colorant particles dispersed within one or more phosphor layers is also described as an optimization technique in U.S. Pat. No. 5,591,982 entitled "Radiation Image Storage Panel and Radiation Image Recording and Reproducing Method" to Kohda. Laser stimulation can be directed to the dual-sided phosphor layers by a single laser on one side of the imaging plate or by lasers on opposite sides of the imaging plate, for example as described in U.S. Pat. No. 6,016,356 entitled "Image Superposition Processing Method" to Ito et al. The pixel image data for the final image from these systems is obtained by combining the superimposed data components from each sensor. Various methods have been proposed for this combination, typically using some type of weighted addition technique, with various more elaborate processing techniques such as Fourier transform processing and wavelet transform processing also described.

While there have been attempts to optimize the read-out apparatus, imaging panel design, and image combination algorithms, the dual-sided read approach is hampered by a number of difficulties inherent to this image-reading method. For example, the read-out apparatus positioned on each side of an imaging plate adds bulk and complexity to the design of an image-reading device. Moreover, as noted earlier, neither the dual-sided read approach nor proposed approaches using multiple scans improve system MTF.

Thus, while conventional CR x-ray imaging systems may have achieved a certain degrees of success in their particular applications, there still exists a need to provide a CR imaging system with improved image quality. Because the potential benefits of improved image quality can help both to enhance diagnostic efficacy and to reduce patient dosage levels, there is high motivation for achieving even incremental improvements in performance.

SUMMARY OF THE INVENTION

An object of the present invention is to provide a method for reading out images from a storage phosphor with improved image quality. With this object in mind, the present invention provides a radiation image formation read out method for a storage phosphor screen which has been subjected to radiation to form a latent image therein. The method comprising the steps of: exposing the storage phosphor screen to a first stimulating radiation from a first side of the storage phosphor screen to release a first stimulated radiation in the pattern of the stored image, wherein the first stimulating radiation is at a first power level, a first scan speed, and a first set of scanning parameters; photoelectrically detecting the first stimulated radiation; exposing the storage phosphor screen to a second stimulating radiation from the first side of the storage phosphor screen to release a second stimulated radiation in the pattern of the stored image, wherein the second stimulating radiation is at a second power level, a second scan speed, and a second set of scanning parameters, and wherein the second scanning exposure is higher than the first scanning exposure and wherein the second set of scanning parameters differ in at least one parameter from the first set of scanning parameters; photoelectrically detecting the second stimulated radiation; and combining the photoelectrically detected first and second stimulated radiation to form a combined image signal.

According to another aspect, the present invention provides a scanner apparatus for obtaining a radiation image stored on a phosphor imaging screen, the apparatus comprising: a) a laser source for providing a stimulating radiation beam; b) a first readout system comprising: (i) a beamsplitter for redirecting a portion of the stimulating radiation beam as a first stimulating radiation; (ii) first scanning optics for conditioning the stimulating radiation and directing the conditioned stimulating radiation toward the phosphor imaging screen to obtain a first emitted light conditioned by the stored image; (iii) a first sensor apparatus positioned on the same side of the phosphor imaging screen as the first scanning optics and disposed to obtain the first emitted light from the phosphor imaging screen and to direct, to an image processor, a first signal corresponding to the light level; c) a second readout system comprising: (i) a turning mirror for redirecting the remaining portion of the stimulating radiation beam as a second stimulating radiation; (ii) second scanning optics for conditioning the stimulating radiation and directing the conditioned stimulating radiation toward the phosphor imaging screen to obtain a second emitted light conditioned by the stored image; (iii) a second sensor apparatus positioned on the same side of the phosphor imaging screen as the first scanning optics and disposed to obtain the second emitted light from the phosphor imaging screen and to direct, to the image processor, a second signal corresponding to the light level; d) a transport apparatus for providing relative motion between the phosphor imaging screen and the first and second readout systems.

The present invention provides an apparatus and method for obtaining image data from a phosphor imaging screen using two scans from the same side of the screen.

The present invention is intended to provide image data with both improved MTF and DQE.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1A:
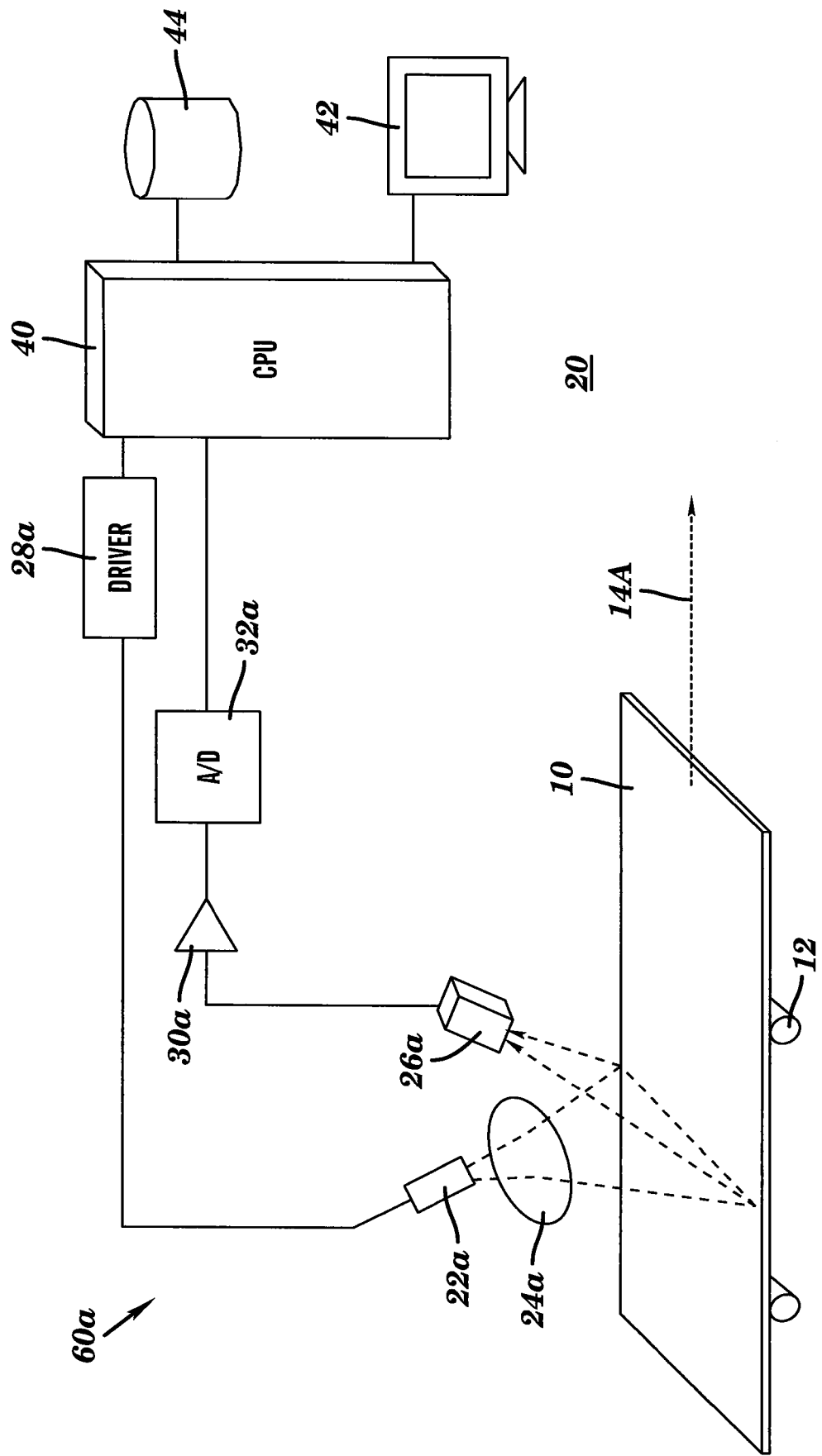
FIGS. 1A and 1B show read-out apparatus for obtaining an image using a single scanning laser according to one embodiment.

The following is a detailed description of the preferred embodiments of the invention, reference being made to the drawings in which the same reference numerals identify the same elements of structure in each of the several figures.

The apparatus and method of the present invention are directed toward improving both DQE and MTF for CR imaging by obtaining a dual scan image read-out, wherein both scans are read from the same side of the imaging plate. The image data obtained from both scans can then be combined together to generate an output image having improved image quality.

Figure 1B:
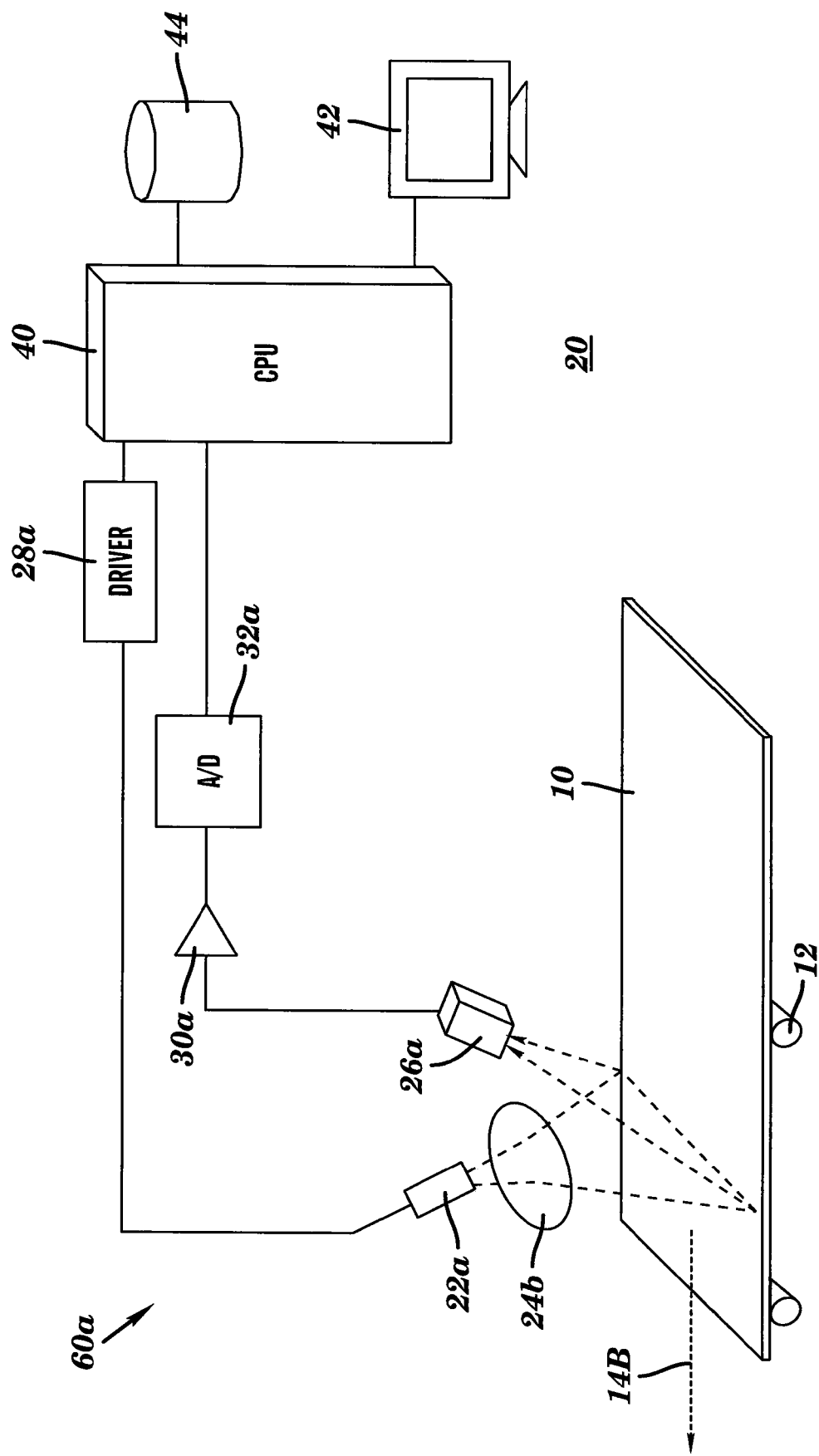

Referring to FIGS. 1A and 1B, there is shown an embodiment of a scanner apparatus 20 used for scanning a storage phosphor screen 10 to obtain the latent image stored therein when exposed to x-ray radiation. The embodiment uses a single readout system 60a that performs two scans of storage phosphor screen 10, i.e., an imaging screen that forms a latent image when exposed to x-ray radiation. For the first scan, a transport apparatus 12 moves storage phosphor screen 10 in a first scan direction 14A, as shown in FIG. 1A. Along its scan path, storage phosphor screen 10 is transported for reading by a readout system 60a that provides stimulating radiation onto storage phosphor screen 10. For this first scan, a first set of scanning parameters is used; the first set of scanning parameters being optimized for a scan at relatively low laser exposure using the scan sequence described in more detail subsequently. For this first scan, the stimulating radiation provided for scanning is at a first power level, a first scan speed, and a first set of scanning parameters. The set of scanning parameters includes at least two of the following: scanning laser spot size, laser power, laser pixel pitch, laser pulse width, laser scanning wavelength, amplifier bandwidth, amplifier gain, and sampling frequency.

Scanning optics 24a are positioned in the optical path to appropriately condition the scanning beam from a laser 22a for this first scan. Following this first scan, storage phosphor screen 10 is returned to its start or home position and scanned a second time, using an alternative parameter set that may include a change in optical components.

FIG. 1B shows the operation of scanner apparatus 20 for performing the second scan in an alternate embodiment. Here, for the second scan, transport apparatus 12 moves storage phosphor screen 10 in the opposite direction 14B for scanning. For this second scan, the stimulating radiation provided for scanning is at a second power level, a second scan speed, and at a second set of scanning parameters. For this second scan, the second set of scanning parameters differ in at least one parameter from the first set of scanning parameters, such as in scanning laser spot size, laser power, laser pixel pitch, laser pulse width, laser scanning wavelength, amplifier bandwidth, amplifier gain, and sampling frequency. The second scan is optimized for a relatively high-power scan, using the scan sequence described in more detail subsequently. Alternate scanning optics 24b are positioned in the optical path to appropriately condition the scanning beam from laser 22a for this second scan.

Scanning optics 24a and 24b may be turreted, for example, or otherwise packaged to allow movement and switching of the appropriate optics components into place for each scan sequence. Movement for switching scanning optics 24a or 24b into position could be effected using conventional mechanisms for switching optical assemblies into position, well known in the optical arts.

Readout system 60a has laser 22a that provides stimulating scanning radiation of a first wavelength and intensity through scanning optics 24a or 24b. Scanning optics 24a and 24b can include, for example, the scanning and beam-shaping optical components used for a flying spot scanner, as is well known in the image scanning arts. A sensor apparatus 26a obtains the stimulated radiation that is emitted from storage phosphor screen 10 at a second wavelength. The sensor signal is conditioned at an amplifier 30a and converted from an analog to a digital signal at a signal converter 32a. A control logic processor (CPU) 40 obtains the digital signal and controls the image processing by which individual scanned portions of storage phosphor screen 10 are assembled together to form a two-dimensional image. The image can be directed to a storage 44, to a display 42, or transmitted to another system.

The apparatus of FIGS. 1A and 1B employ a single laser 22a with switched optics. As such, the apparatus of FIGS. 1A and 1B promotes low cost and simplicity. The apparatus allows multiple scans to be performed from the same side of storage phosphor screen 10, using different sets of scanning parameters and providing two separate scanning exposures, typically different in value.

Figure 1C:
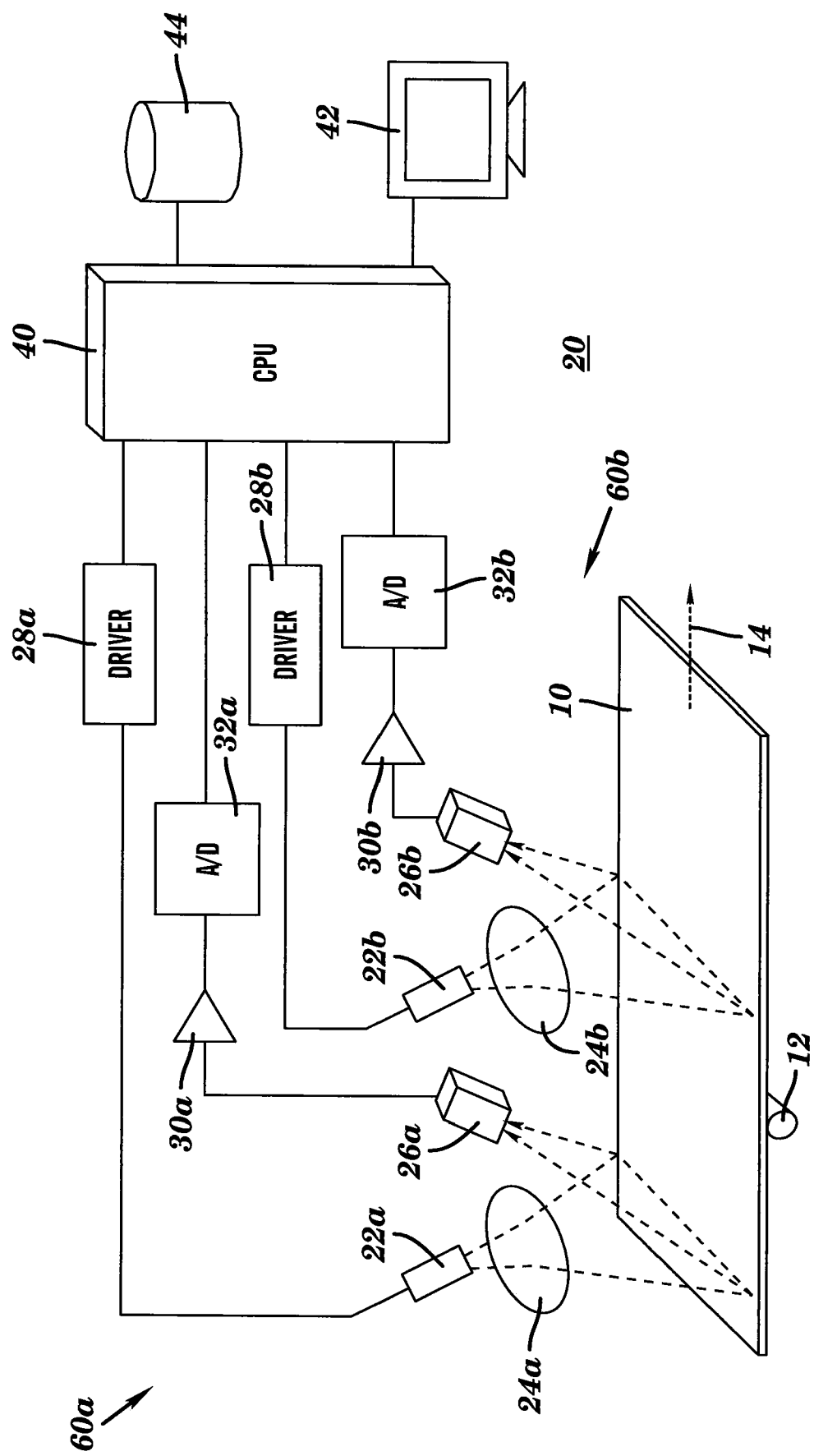
FIG. 1C shows a read-out apparatus for obtaining an image using two scanning lasers according to one embodiment.

Referring now to FIG. 1C, there is shown a scanner apparatus 20 having two readout systems 60a and 60b used for scanning a storage phosphor screen 10 in a single pass. For the scan operation, transport apparatus 12 moves storage phosphor screen 10 in a single scan direction 14. Along its scan path, storage phosphor screen 10 is transported past readout systems 60a and 60b which both provide stimulating radiation onto storage phosphor screen 10 from the same side of storage phosphor screen 10.

The basic components of each readout system 60a and 60b are similar, with necessary changes for the different stimulating radiation characteristics.

Readout system 60b has a structure and components similar to that of readout system 60a in this embodiment. A laser 22b provides stimulating radiation of a desired wavelength and intensity through scanning optics 24b. Laser 22b can be the same type of laser as laser 22a, providing the same or different wavelength and the same or different output beam characteristics. Scanning optics 24b can include, for example, the same type of scanning and beam-shaping optical components used for scanning optics 24a. A sensor apparatus 26b obtains the stimulated radiation that is emitted from storage phosphor screen 10, which may or may not be at the same wavelength sensed by sensor apparatus 26a. The sensor signal is conditioned at an amplifier 30b and converted from an analog to a digital signal at a signal converter 32b. Control logic processor 40 takes this digital image data and combines it with the digital image data obtained from readout system 60a in order to generate a resulting image. The image can be directed to storage 44 or to display 42 or to an image processing system.

Figure 2:
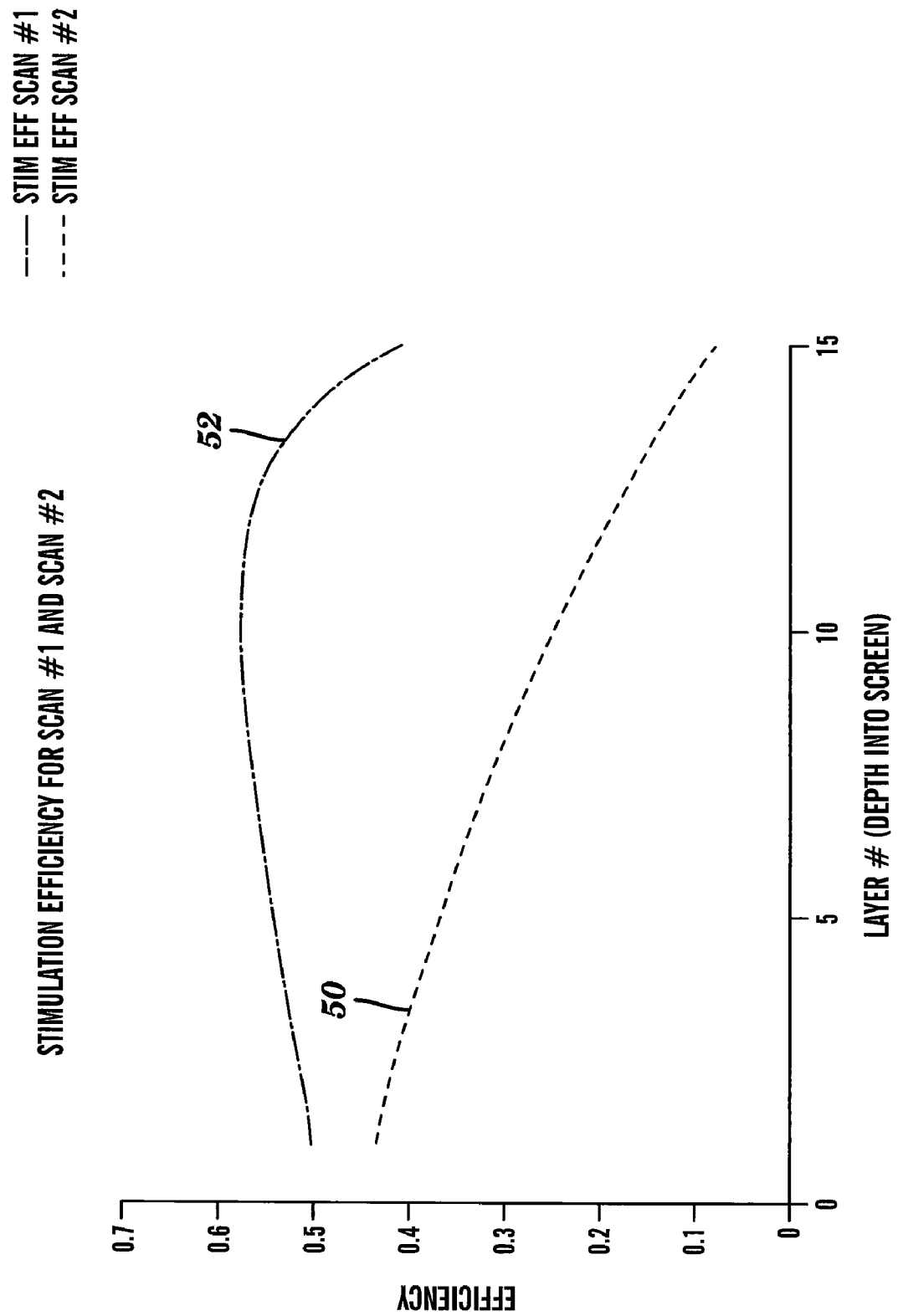
FIG. 2 shows comparative efficiency related to depth for stimulation scans at different power levels.

The graph of FIG. 2 illustrates how the method and apparatus of the present invention promotes enhanced imaging by irradiating storage phosphor screen 10 with separate scanning beams that are incident from the same side of phosphor screen 10. The graph relates calculated percentage efficiency for a single phosphor layer to a depth within the layer, represented by an arbitrary layer number value. A first curve 50 shows percentage stimulation efficiency for a first scan of a stimulable phosphor layer at a first, relatively low laser exposure level. A second curve 52 shows percentage stimulation efficiency for a second scan at a higher laser exposure level.

As shown in FIG. 2, the lower laser exposure scan (curve 50) is more efficient for that portion of phosphor near the surface of the phosphor layer, yielding over 40% efficiency nearest the surface. The second scan (curve 52) obtains nearly 50% efficiency from the same phosphor region. It is noted that the lower laser exposure scan (curve 50) yields significantly reduced efficiency at increased depths. The higher power laser exposure scan (curve 52) shows some increase in efficiency over a region of increased depth. Thus, combining results from the two different scans can help to increase the overall efficiency of the imaging process. This offers the potential benefits of improved diagnostic accuracy and reduced dosage exposure levels.

Different algorithms can be employed to combine the results of the separate scans obtained by readout systems 60a and 60b in FIGS. 1A-1C. For example, signals obtained from the same pixel area can be added using a weighted addition technique. Other techniques are described in previously mentioned U.S. Pat. No. 6,016,356 entitled "Image Superposition Processing Method" to Ito et al.

The single-side dual scan method of the present invention can be used to obtain improved image quality from a CR phosphor imaging plate of conventional design. To promote the single-side dual scan method, a CR imaging screen can optimized for the method.

Figure 3:
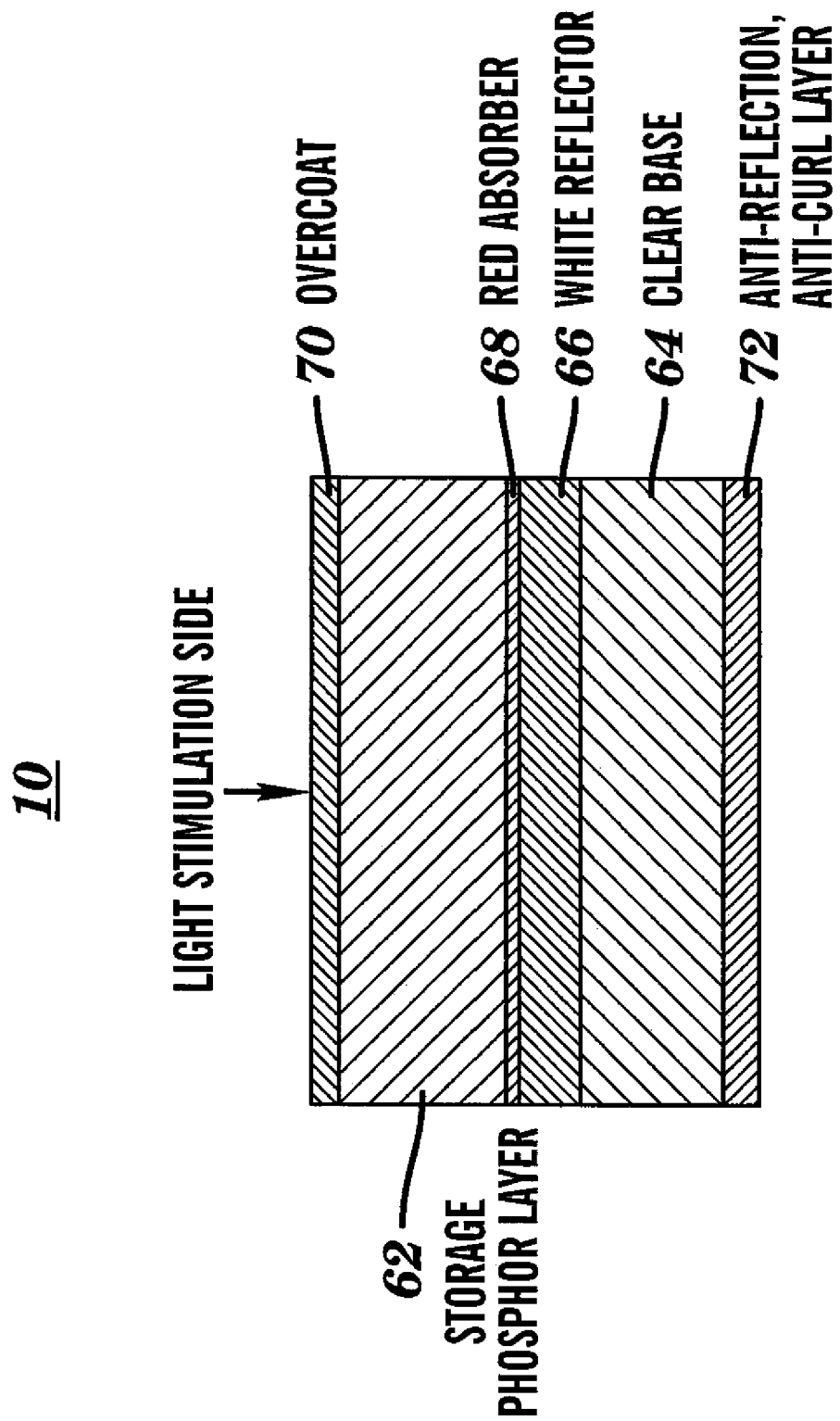
FIG. 3 shows a cross-section view of an image storage phosphor screen according to one embodiment.

Referring to FIG. 3, there is shown a cross-section view of an image storage phosphor screen 10 according to one embodiment. Storage phosphor screen 10 has a single storage phosphor layer 62. A reflection layer 66, such as a white diffusive reflector, is provided to reflect stimulated light back in the direction of sensor apparatus 26a, 26b. Diffuse or specular reflection can be provided. A red absorber layer 68 is provided to absorb stimulating radiation from laser 22a or 22b, so that stray light does not interfere with the image signal. A clear base 64, such as a transparent Estar base for example, provides a substrate structure for storage phosphor screen 10 in one embodiment. In another embodiment, diffusive material is dispersed in base 64 so that a separate reflection layer 66 is not needed. Storage phosphor screen 10 can include an optional anti-reflection layer 72 or anti-curl layer as well as one or more protective layers 70 for protection of the phosphor material. Red absorber layer 68 is optional, and its function can alternately be performed by dispersed colorant particles within phosphor layer 62.

Figure 4:
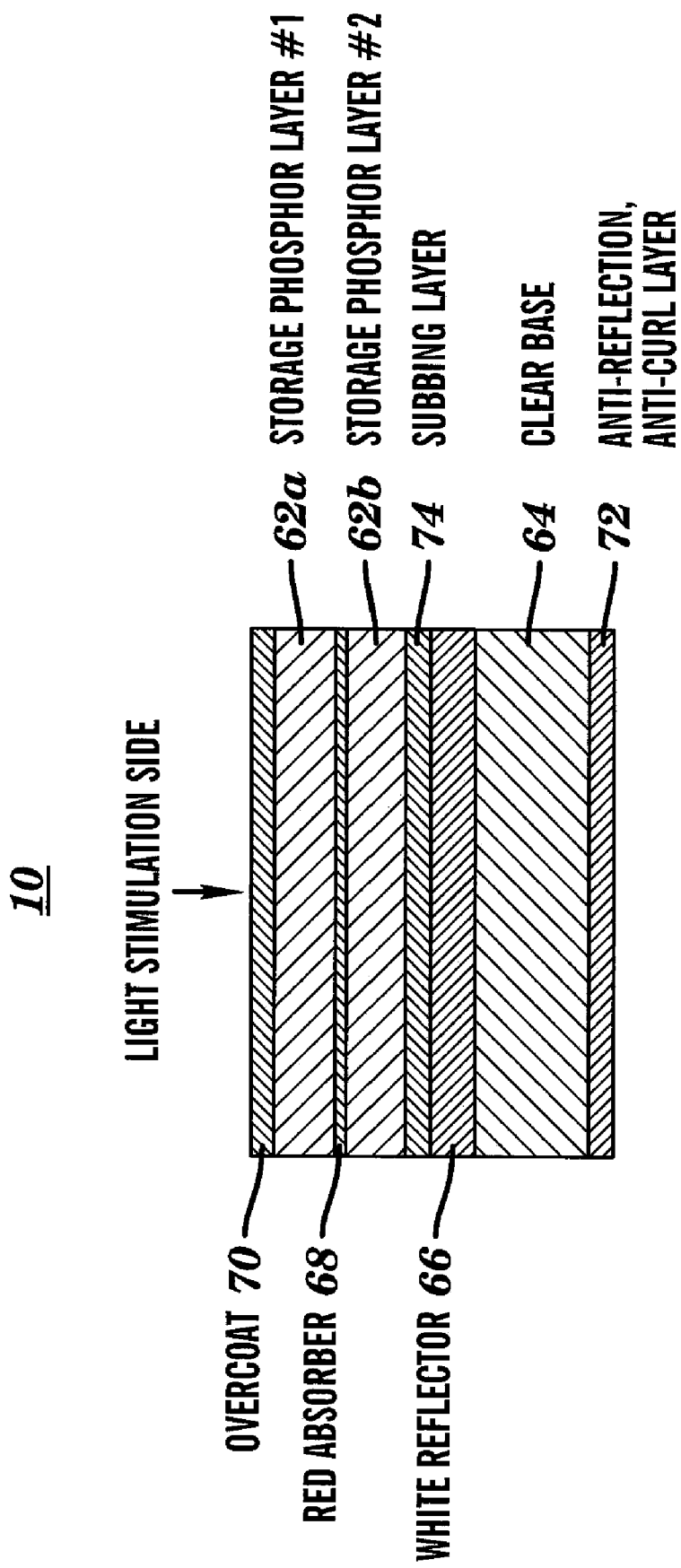
FIG. 4 shows a cross-section view of an image storage phosphor screen according to an alternate embodiment.

Referring to FIG. 4, there is shown a cross-section view of an image storage phosphor screen 10 according to another embodiment wherein the storage phosphor screen 10 has first and second phosphor layers 62a, 62b. In the screen shown in FIG. 4, red absorber layer 68 is disposed between two phosphor layers 62a and 62b, absorbing at least some portion of the stimulating radiation. Reflection layer 66 is provided between the phosphor material and substrate base 64. As with the arrangement shown in FIG. 3, material for reflection or scattering can be provided as part of base 64. An optional subbing layer 74 can be provided between phosphor layer 62b and reflection layer 66.

It can be appreciated that the dual-layer arrangement shown in FIG. 4 can provide some advantages as compared to the single-layer arrangement of FIG. 3. For example, the arrangement of FIG. 4 allows for different phosphor material formulations on each phosphor layer 62a, 62b, each layer optimized for providing the optimum efficiency when irradiated with stimulating light of different levels, as was described earlier with reference to FIGS. 1A, 1B, 1C, and 2. With different chemical composition, phosphor layers 62a, 62b can have different emission wavelengths.

Figure 5:
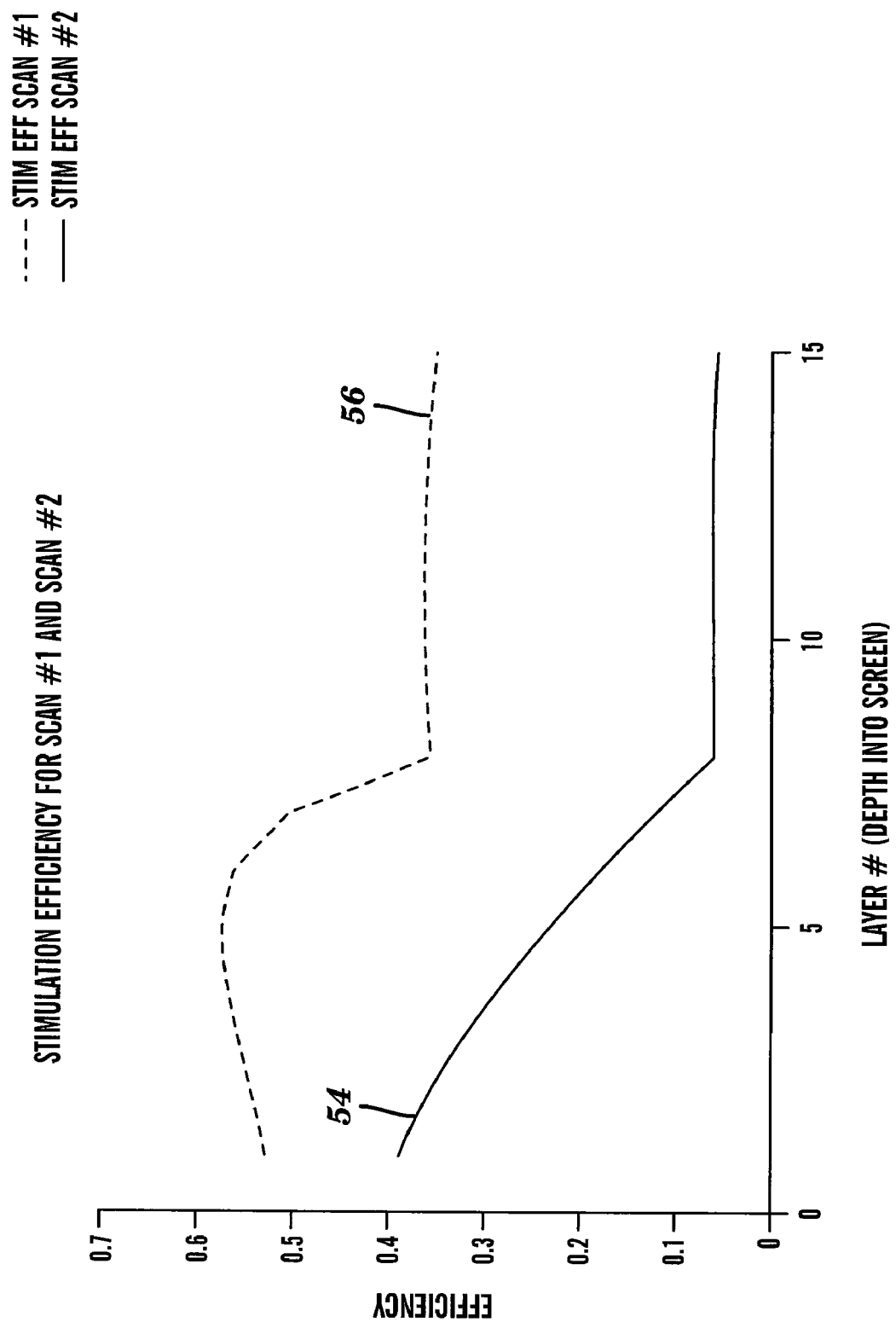
FIG. 5 shows a graph of comparative efficiency related to depth for stimulation scans at different power levels using the alternate embodiment of FIG. 4.

FIG. 5 shows a graph of comparative efficiency related to depth for stimulation scans at different power levels for the embodiment of FIG. 4. More particularly, there is shown an efficiency yield for one embodiment of storage phosphor screen 10 having multiple phosphor layers 62a, 62b. A first scan at lower laser exposure is represented by a curve 54. As shown, the first scan obtains high efficiency near the surface of its phosphor material but exhibits significant dropoff with increased depth. The second, higher laser exposure scan, represented by a curve 56, obtains highest efficiency near a middle depth. The signal in the second scan is predominantly from the lower portion of the phosphor coating. The signal from the first scan is predominantly from the top portion.

Referring back to FIG. 1C, readout systems 60a and 60b direct laser light of different intensities to storage phosphor screen 10. Laser intensity can be modulated, for example, by controlling laser power or by pulse width modulation, for example.

The amount of time over which stimulating light is provided can also be changed. With the arrangement of FIGS. 1A-1C, changing the time for exposure to stimulating radiation can mean altering the scan sequence so that separate passes would be performed, with transport apparatus 12 operating at either of two different speeds. Optionally, separate transport apparatus can be provided to support each readout system 60a, 60b.

Figure 6:
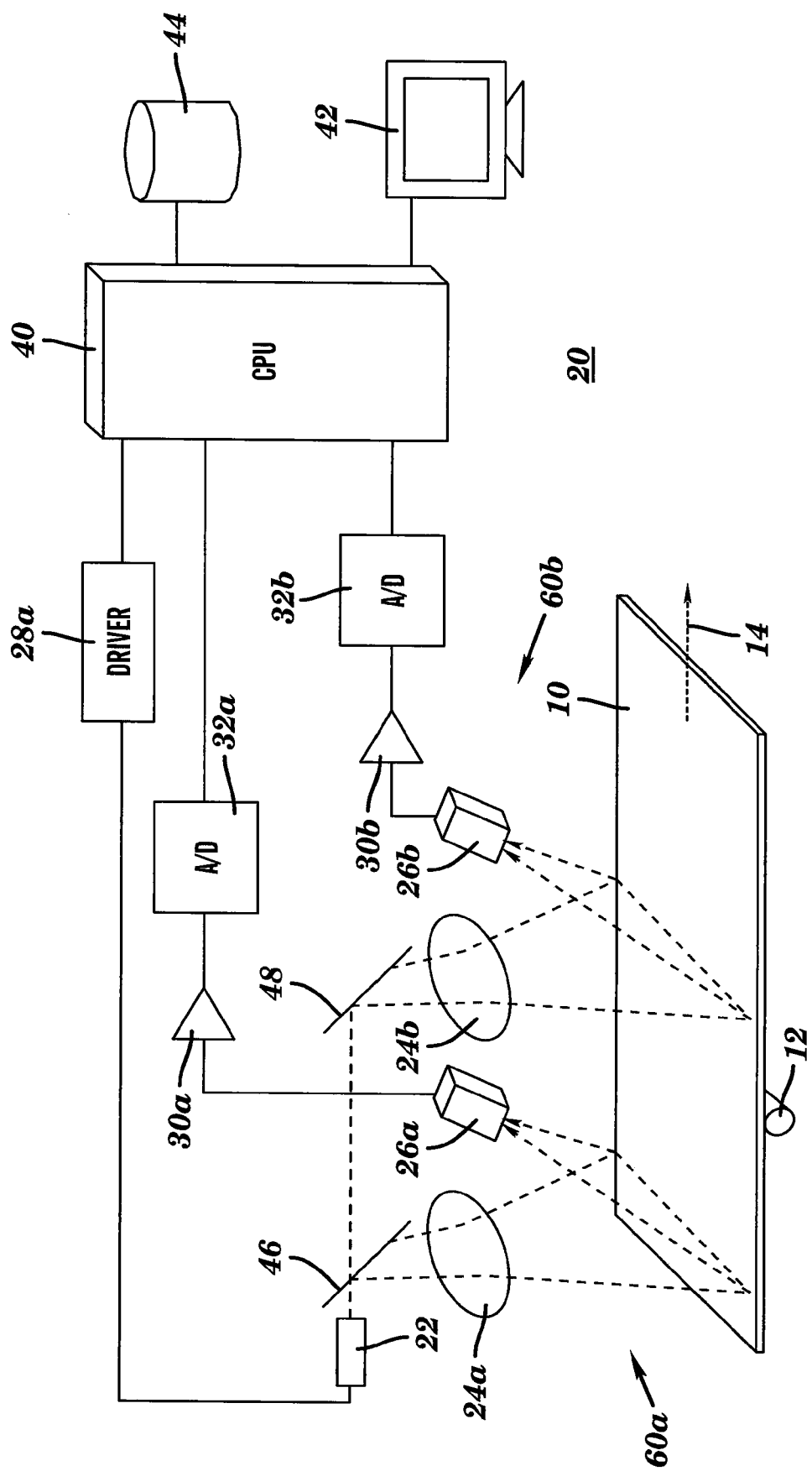
FIG. 6 shows an embodiment of a read-out apparatus using a single laser source.

Parameters of the stimulating radiation provided through scanning optics 24a and 24b can be different, for example, light wavelength, spot size, laser pulse width, sampling frequency, amplifier bandwidth (for anti-aliasing), amplifier gain, or pixel pitch. While other systems apply two separate scans to a storage phosphor medium (such as for expanded dynamic range), the apparatus and method of the present invention optimize scan parameters to enhance both DQE and MTF.

Where the same wavelength is acceptable, light from a single source can be split into separate paths for performing the different scans, such as shown in the embodiment of FIG. 6. As shown, light from a laser 22 is directed toward a beamsplitter 46 whereby a first portion of light is directed to first readout system 60a, with another portion going to second readout system 60b by way of a mirror 48. Scanning optics 24a, 24b in each readout system 60a, 60b shape the laser beam and deliver the light to storage phosphor screen 10 generally as described with reference to FIGS. 1A-1C. Signal acquisition by sensor apparatus 26a, 26b, and supporting amplifier and signal converter components is similar to that described for the two-laser embodiment of FIG. 1C.

Control logic processor 40 may be embodied in a number of arrangements and can include multiple components, including multiple networked processors, for example. In one arrangement, control logic processor 40 is a dedicated microprocessor that is programmed to carry out the scanning and image acquisition functions. In another arrangement, control logic processor 40 is a computer workstation. Storage 44 can include one or more local or networked memory or storage devices. Control logic processor 40 can be in communication with other processing systems, such as those used for diagnostic image assessment, for example.

As noted above, it is desirable to have an x-ray imaging system with improved MTF and DQE to provide improved diagnostic efficacy and/or lower patient dose. However, factors that tend to improve high frequency MTF tend, at the same time, to degrade low frequency DQE. Similarly, steps taken to improve low frequency DQE tend to compromise high frequency MTF. For example, for a given storage phosphor screen thickness, increasing the readout laser exposure decreases high frequency MTF while increasing low frequency DQE. Conversely, lower laser exposure increases high frequency MTF while decreasing low frequency DQE. Given these constraints, optimizing CR by simultaneously improving MTF and DQE is challenging.

FIGS. 7-11 are directed to describing photoelectrically detecting a second stimulated radiation wherein a first stimulated radiation has a greater amount of high spatial frequency image data than the second stimulated radiation.

Figure 7:
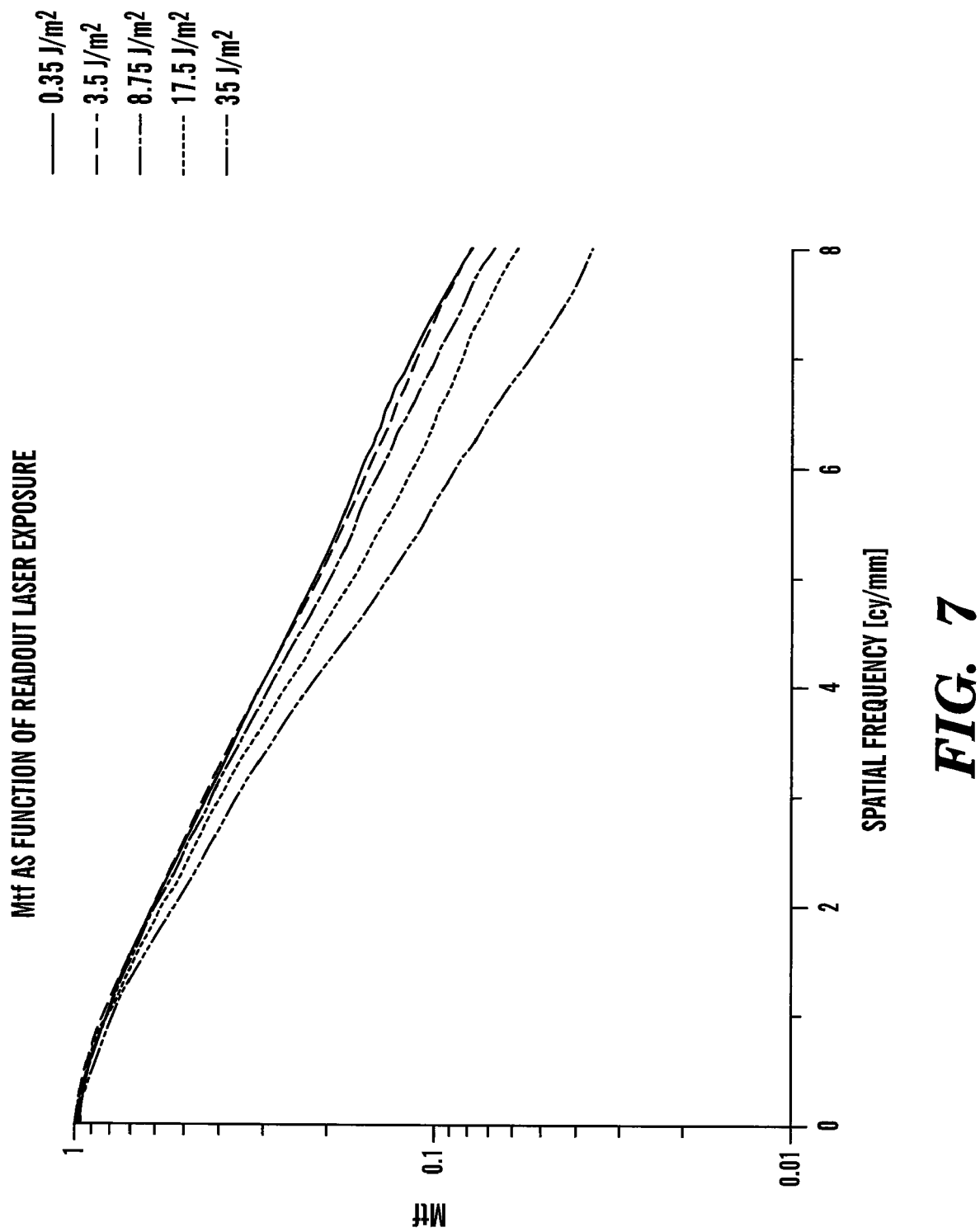
FIG. 7 shows MTF as a function of readout laser exposure for an experimental coating of phosphor.
Figure 8:
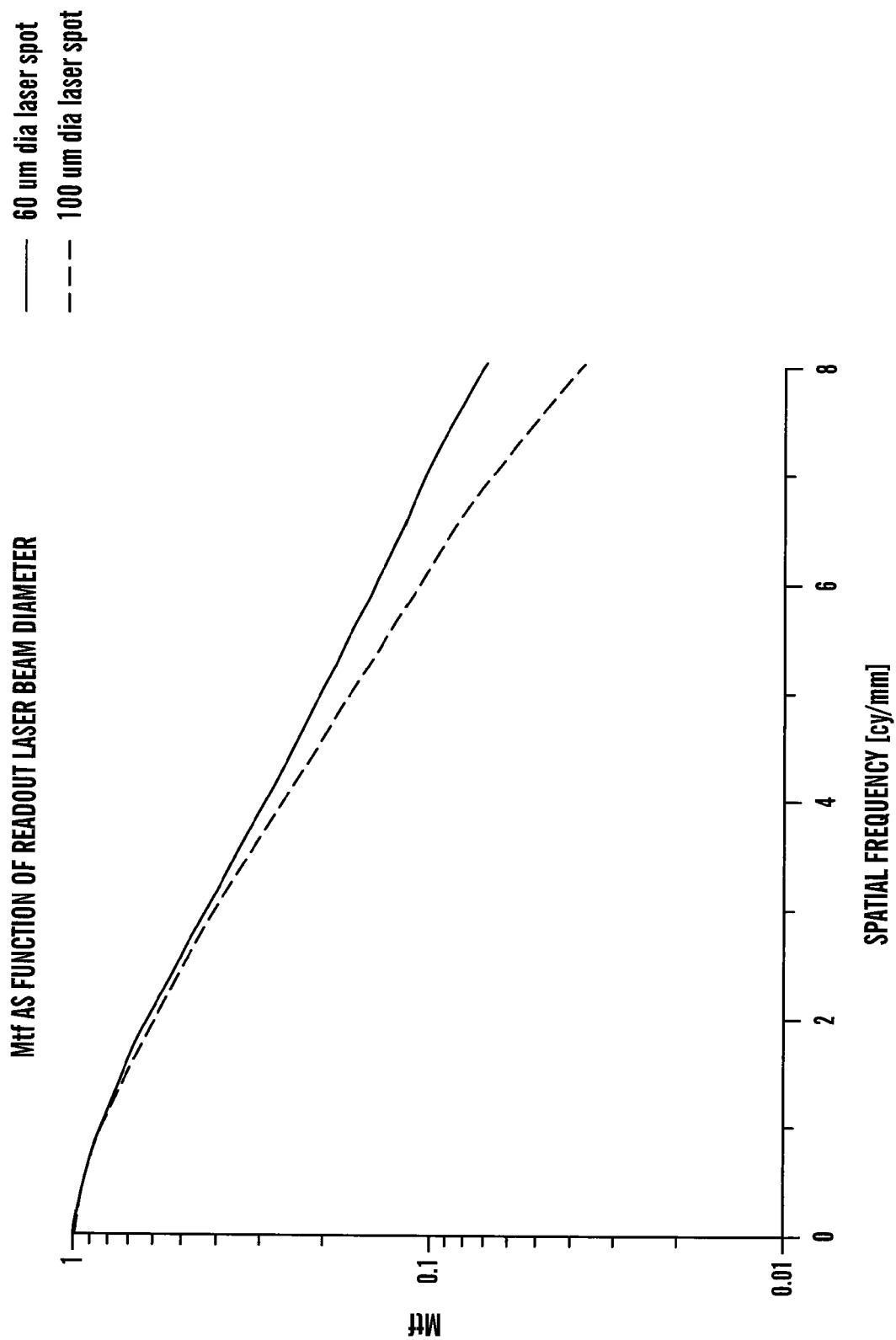
FIG. 8 shows MTF as a function of readout laser beam diameter.
Figure 11:
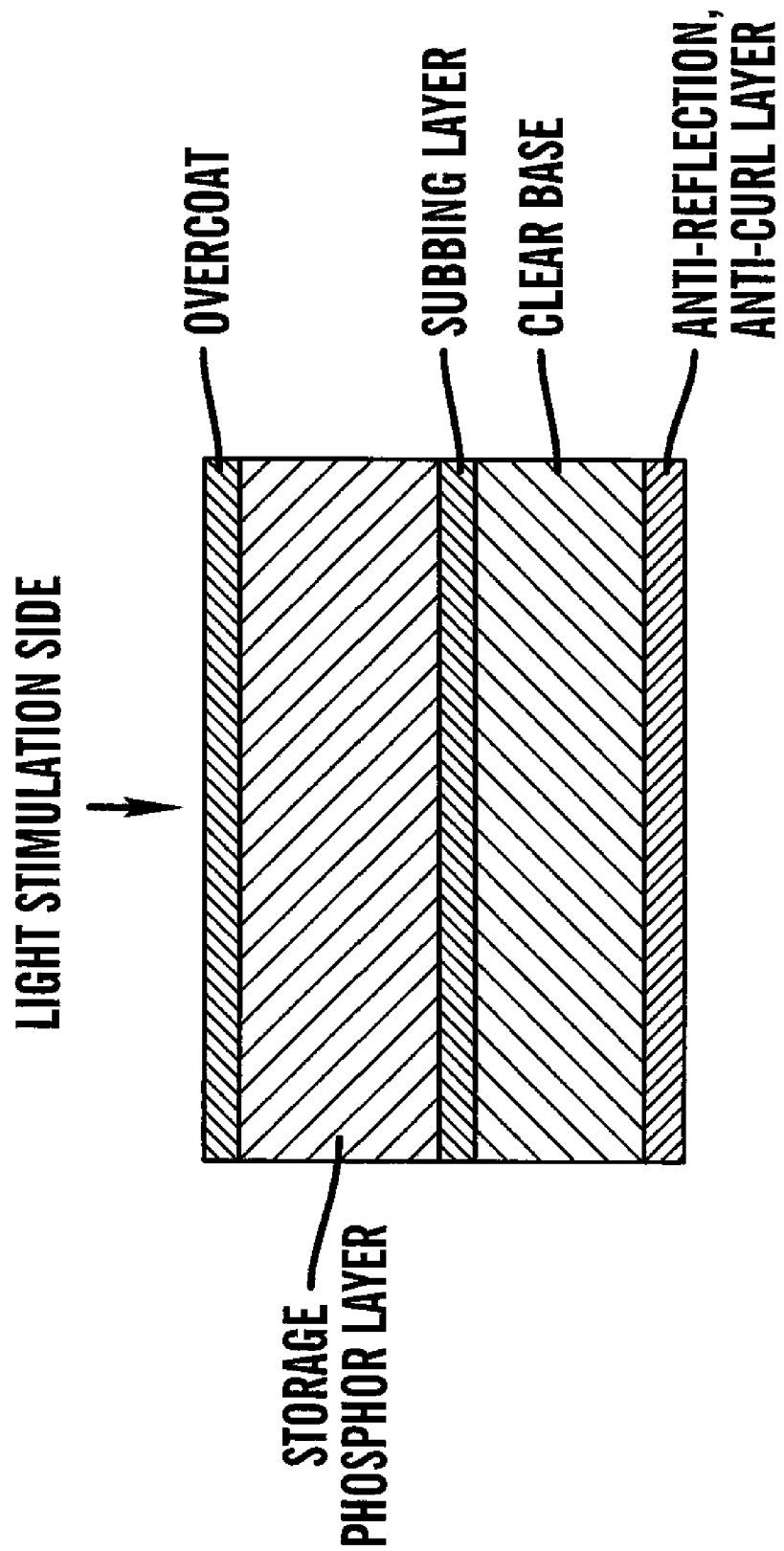
FIG. 11 shows a screen configuration relevant for FIG. 7.

FIG. 7 shows how MTF degrades as a function of readout laser exposure for an experimental 40 gr/ft2 coating of BaF-BrI phosphor similar to mammographic screen (EHR-M Product). The screen configuration is depicted in FIG. 11. The MTF for this screen decreases as a function of readout laser exposure. The MTF can also be increased by using a smaller readout diameter beam as shown in FIG. 8. While MTF is a measurement of signal in the absence of noise and while a good indicator of sharpness, a metric that includes noise is required to determine system performance.

Figure 9:
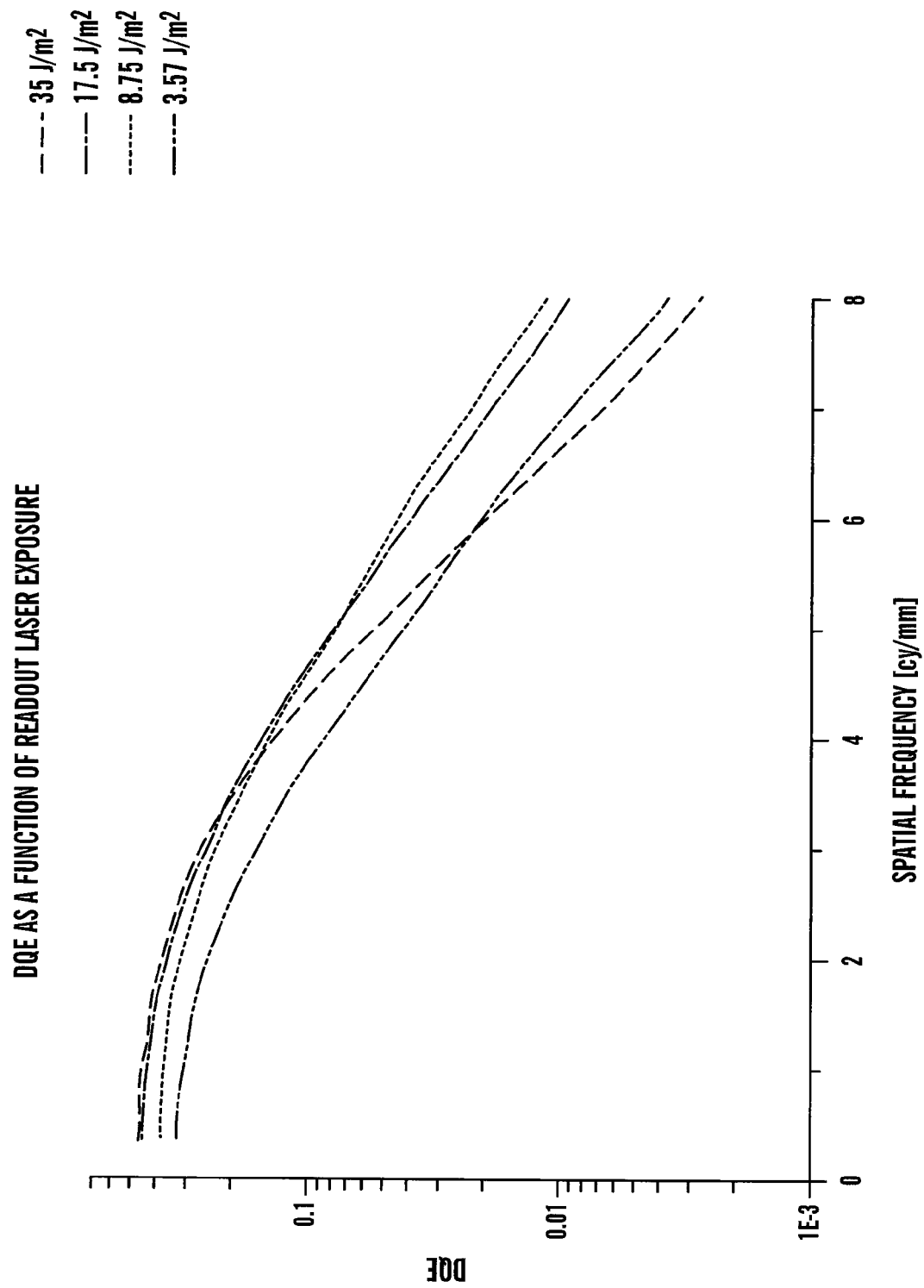
FIG. 9 shows DQE as a function of readout laser exposure.
Figure 10:
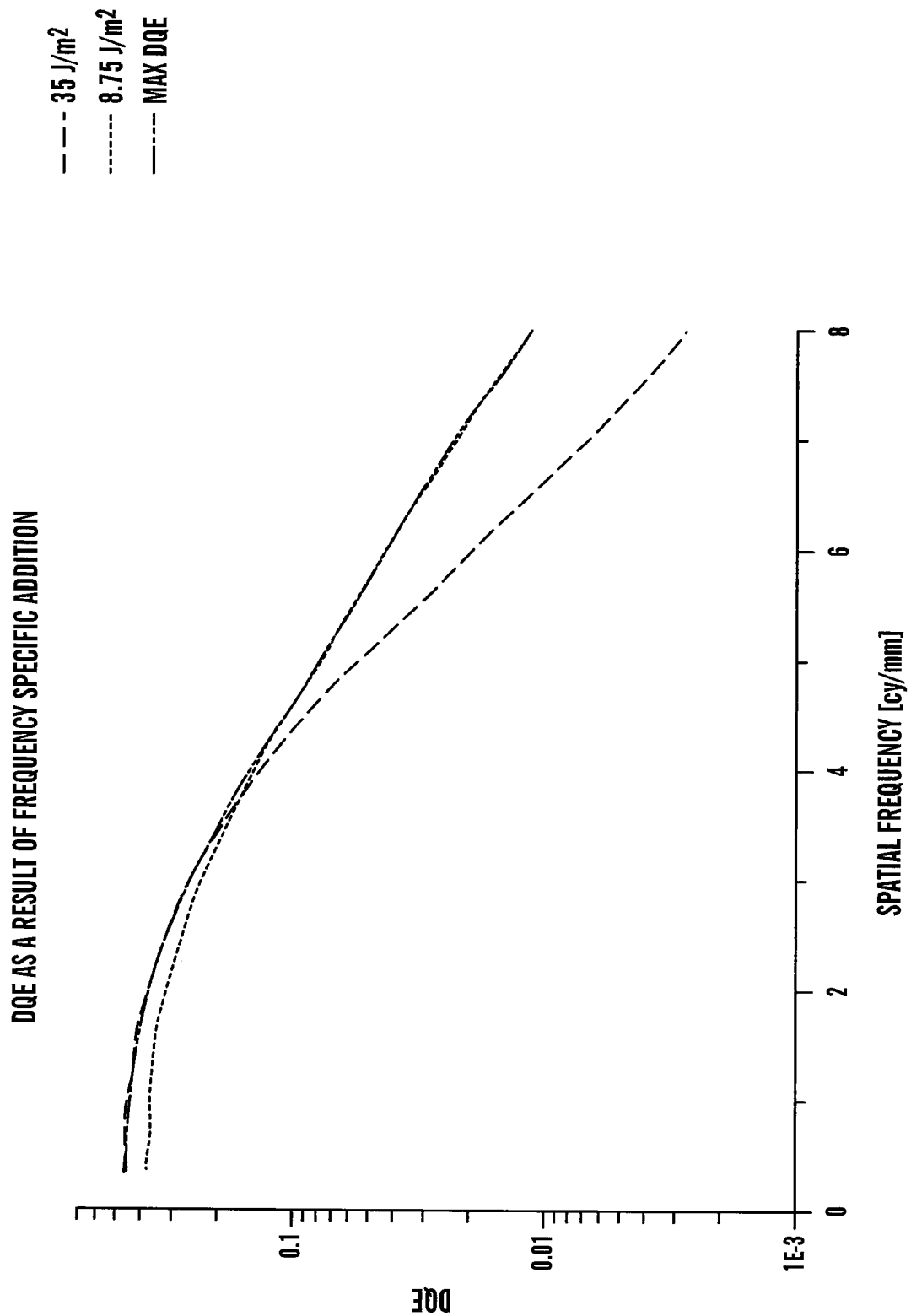
FIG. 10 shows DQE as a result of frequency specific addition.

FIG. 9 shows the DQE(f) as a function of readout laser exposure. In general, once the readout exposure is high enough (~8 J/m2 for this screen and CR reader) so that system performance is not limited by the readout system noise floor, the DQE at high spatial frequencies decreases as the laser readout exposure increases. Conversely, as the readout laser exposure increases, the low frequency DQE(f) increases. Therefore, for a given CR screen readout only once, the DQE(f) can not be optimized for all frequencies. However, if a relatively low readout laser exposure is used for the first scan at ~8 J/m2 then the image data will have a greater amount of high frequency DQE, and when stimulated a second time with a higher readout laser exposure, a second image will be formed such that when the two images are added with frequency specific methods such as the Fourier transform and then converted back to the spatial domain with an inverse Fourier transform, the DQE(f) will be maximized over the whole spatial frequency range, as depicted by the black dashed line in FIG. 10.

Accordingly, what is describes in an image read out method for a storage phosphor screen which has been subjected to radiation to form a latent image. The storage phosphor screen are exposed to a first stimulating radiation from a first side of the storage phosphor screen to release a first stimulated radiation in the pattern of the stored latent image, wherein the first stimulating radiation is at a first power level, a first scan speed, and a first set of scanning parameters. The first stimulated radiation is photoelectrically detected. The storage phosphor screen is exposed to a second stimulating radiation from the first side of the storage phosphor screen to release a second stimulated radiation in the pattern of the stored latent image, wherein the second stimulating radiation is at a second power level, a second scan speed, and a second set of scanning parameters, wherein the second scanning exposure is higher than the first scanning exposure, and wherein the second set of scanning parameters differ in at least one parameter from the first set of scanning parameters. The second stimulated radiation is photoelectrically detected, the first stimulated radiation having a greater amount of high spatial frequency image data than the second stimulated radiation. The photoelectrically detected first and second stimulated radiation are combined to form a combined image signal.

The invention has been described in detail with particular reference to a presently preferred embodiment, but it will be understood that variations and modifications can be effected within the spirit and scope of the invention. For example, a variety of different types of laser components can be used, including laser diodes. The presently disclosed embodiments are therefore considered in all respects to be illustrative and not restrictive. The scope of the invention is indicated by the appended claims, and all changes that come within the meaning and range of equivalents thereof are intended to be embraced therein.

Thus, what is provided is a method and apparatus for scanning radiation images recorded in a stimulable phosphor layer on a storage phosphor screen.

A computer system used in conjunction with the present invention may include one or more storage media, for example: magnetic storage media such as magnetic disk (such as a floppy disk) or magnetic tape; optical storage media such as optical disk, optical tape, or machine readable bar cod; solid-state electronic storage devices such as random access memory (RAM), or read-only memory (ROM); or any other physical device or media employed to store a computer program having instructions for controlling one or more computers to practice the method according to the present invention.

PARTS LIST

10 Storage phosphor screen
12 Transport apparatus
14, 14A, 14B Direction
20 Scanner apparatus
22, 22a, 22b Laser
24a, 24b Scanning optics
26a, 26b Sensor apparatus
28a, 28b Driver
30a, 30b Amplifier
32a, 32b Signal converter
40 Control logic processor
42 Display
44 Storage
46 Beamsplitter
48 Mirror
50, 52, 54, 56 Curve
60a, 60b Readout system
62, 62a, 62b Phosphor layer
64 Base
66 Reflection layer
68 Absorber layer
70 Protective layer
72 Anti-reflection layer
74 Subbing layer

The invention claimed is:

1. An image read out method for a storage phosphor screen which has been subjected to radiation to form a latent image therein, the method comprising:

exposing the storage phosphor screen to a first stimulating radiation from a first side of the storage phosphor screen to release a first stimulated radiation in the pattern of the stored latent image, wherein the first stimulating radiation is at a first power level, a first scan speed, and a first set of scanning parameters;

photoelectrically detecting the first stimulated radiation;

exposing the storage phosphor screen to a second stimulating radiation from the first side of the storage phosphor screen to release a second stimulated radiation in the pattern of the stored latent image, wherein the second stimulating radiation is at a second power level, a second scan speed, and a second set of scanning parameters, wherein the second scanning exposure is higher than the first scanning exposure, and wherein the second set of scanning parameters differ in at least one parameter from the first set of scanning parameters;

photoelectrically detecting the second stimulated radiation, the first stimulated radiation having a greater amount of high spatial frequency image data than the second stimulated radiation; and combining the photoelectrically detected first and second stimulated radiation to form a combined image signal.

2. The method of claim 1, wherein the first and second set of scanning parameters include at least two of the following: scanning laser spot size, laser power, laser pixel pitch, laser pulse width, laser scanning wavelength, amplifier bandwidth, amplifier gain, and sampling frequency.

3. The method of claim 1 wherein combining comprises performing a weighted addition of values obtained from the photoelectronic detection.

4. The method of claim 1 wherein combining comprises a transform operation taken from the following: a Fourier transform or a wavelet transform.

5. The method of claim 1 further comprising the step of changing at least one optical component between the first scanning exposure and the second scanning exposure.

6. The method of claim 1 wherein a first laser is used for exposing at a first scanning exposure and a second laser is used for exposing at a second scanning exposure.

7. The method of claim 1 wherein the same laser is used for exposing at a first scanning exposure and for exposing at a second scanning exposure.

8. A computer storage product having at least one computer storage medium having instructions stored therein causing one or more computers to perform the method of claim 1.

9. A scanner apparatus for obtaining a latent radiation image stored on a phosphor imaging screen, the apparatus comprising:
  a) a readout system comprising:
    (i) a laser light source providing stimulating radiation;
    (ii) first scanning optics positioned on one side of the phosphor imaging screen for conditioning the stimulating radiation and directing the conditioned stimulating radiation toward the phosphor imaging screen to obtain a first emitted light;
    (iii) second scanning optics positioned on one side of the phosphor imaging screen for conditioning the stimulating radiation and directing the conditioned stimulating radiation toward the phosphor imaging screen to obtain a second emitted light, wherein the first and second scanning optics can be switched into position; and
    (iv) a sensor apparatus positioned on the same side of the phosphor imaging screen as the first and second scanning optics and disposed to sense the first and second emitted light from the phosphor imaging screen and direct, to an image processor, a signal corresponding to the light level, the first emitted light having a greater amount of high spatial frequency image data than the second emitted light; and
  b) a transport apparatus providing relative motion between the phosphor imaging screen and the readout system.

10. A scanner apparatus for obtaining a latent radiation image stored on a phosphor imaging screen, the apparatus comprising:
  a) a first readout system comprising:
    (i) a first laser light source for providing a first stimulating radiation;
    (ii) first scanning optics positioned on one side of the phosphor imaging screen for conditioning the first stimulating radiation and directing the conditioned first stimulating radiation toward the phosphor imaging screen to obtain a first emitted light; and
    (iii) a first sensor apparatus positioned on the same side of the phosphor imaging screen as the first scanning optics to obtain the first emitted light from the phosphor imaging screen and to direct, to an image processor, a first signal corresponding to the first emitted light;
  b) a second readout system comprising:
    (i) a second laser light source for providing a second stimulating radiation;
    (ii) second scanning optics positioned on one side of the phosphor imaging screen for conditioning the second stimulating radiation and directing the conditioned second stimulating radiation toward the phosphor imaging screen to obtain a second emitted light; and
    (iii) a second sensor apparatus positioned on the same side of the phosphor imaging screen as the first scanning optics to obtain the second emitted light from the phosphor imaging screen and to direct, to the image processor, a second signal corresponding to the second emitted light, the first emitted light having a greater amount of high spatial frequency image data than the second emitted light; and
  c) a transport apparatus providing relative motion between the phosphor imaging screen and the first and second readout systems.

11. The apparatus of claim 10 wherein the first and second laser light sources differ in laser power and in at least one of the following: wavelength of stimulating radiation, sampling frequency, scan speed, pixel pitch, amplifier bandwidth, amplifier gain, and spot size.

12. The apparatus of claim 10 wherein the phosphor imaging screen has a single phosphor layer storing the radiation image.

13. The apparatus of claim 10 wherein the phosphor imaging screen has at least a first phosphor layer and a second phosphor layer storing the radiation image.

14. The apparatus of claim 10 wherein the phosphor imaging screen further comprises a reflective layer.

15. The apparatus of claim 10 wherein the image processor combines information from the first and second light signals to form a composite image.

16. A scanner apparatus for obtaining a latent radiation image stored on a phosphor imaging screen, the apparatus comprising:
  a) a laser source for providing a stimulating radiation beam;
  b) a first readout system comprising:
    (i) a beamsplitter directing a first portion of the stimulating radiation beam as a first stimulating radiation;
    (ii) first scanning optics for conditioning the first stimulating radiation and directing the conditioned first stimulating radiation toward the phosphor imaging screen to obtain a first emitted light; and
    (iii) a first sensor apparatus positioned on the same side of the phosphor imaging screen as the first scanning optics to obtain the first emitted light from the phosphor imaging screen and to direct, to an image processor, a first signal corresponding to the emitted light;
  c) a second readout system comprising:
    (i) a mirror for directing a second portion of the stimulating radiation beam as a second stimulating radiation;

(ii) second scanning optics for conditioning the second stimulating radiation and directing the conditioned second stimulating radiation toward the phosphor imaging screen to obtain a second emitted light; and (iii) a second sensor apparatus positioned on the same side of the phosphor imaging screen as the first scanning optics to obtain the second emitted light from the phosphor imaging screen and to direct, to the image processor, a second signal corresponding to the emitted light, the first emitted light having a greater amount of high spatial frequency image data than the second emitted light; and d) a transport apparatus providing relative motion between the phosphor imaging screen and the first and second readout systems.

* * * * *